(12) United States Patent
Kim

(10) Patent No.: US 11,691,631 B2
(45) Date of Patent: Jul. 4, 2023

(54) APPARATUS FOR ESTIMATING FRICTION COEFFICIENT OF ROAD SURFACE AND METHOD THEREOF

(71) Applicants: Hyundai Motor Company, Seoul (KR); Kia Motors Corporation, Seoul (KR)

(72) Inventor: Nam Han Kim, Bucheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 397 days.

(21) Appl. No.: 16/884,571

(22) Filed: May 27, 2020

(65) Prior Publication Data

US 2021/0171044 A1 Jun. 10, 2021

(30) Foreign Application Priority Data

Dec. 4, 2019 (KR) ........................ 10-2019-0159980

(51) Int. Cl.
 *B60W 40/068* (2012.01)
 *B60W 30/02* (2012.01)
 *B62D 15/02* (2006.01)
 *B60T 8/1755* (2006.01)

(52) U.S. Cl.
 CPC ....... *B60W 40/068* (2013.01); *B60T 8/17551* (2013.01); *B60W 30/02* (2013.01); *B62D 15/02* (2013.01); *B60W 2552/40* (2020.02); *B60W 2710/18* (2013.01)

(58) Field of Classification Search
 CPC ............... B60W 40/068; B60W 30/02; B60W 2552/40; B60W 2710/18; B60W 2420/00; B60W 10/20; B60W 30/045; B60W 40/105; B60T 8/17551; B60T 2210/12; B60T 2260/024; B60T 8/172; B62D 15/02; B62D 7/159; B62D 6/006
 See application file for complete search history.

(56) References Cited

U.S. PATENT DOCUMENTS

| 6,526,804 | B2 | 3/2003 | Takahashi | |
|---|---|---|---|---|
| 6,597,980 | B2 | 7/2003 | Kogure | |
| 8,078,351 | B2* | 12/2011 | Nardi | B60T 8/172 702/142 |
| 8,315,758 | B2* | 11/2012 | Takenaka | B60T 8/172 701/72 |
| 8,682,599 | B2 | 3/2014 | Shiozawa et al. | |
| 9,550,480 | B2* | 1/2017 | Asano | B60T 8/1755 |

(Continued)

FOREIGN PATENT DOCUMENTS

| EP | 2583872 A1 | 4/2013 |
|---|---|---|
| JP | 2010179678 A | 8/2010 |
| KR | 101961081 B1 | 3/2019 |

*Primary Examiner* — Mussa A Shaawat
(74) *Attorney, Agent, or Firm* — Slater Matsil, LLP

(57) ABSTRACT

An apparatus for estimating a friction coefficient of a road surface is provided. The apparatus includes a current sensor configured to measure a control current value of a rear wheel steering (RWS) motor, a stroke sensor configured to measure a stroke value indicating a movement amount of a rear wheel steering link, and a controller configured to estimate the friction coefficient of the road surface based on the control current value measured by the current sensor and the stroke value measured by the stroke sensor.

20 Claims, 6 Drawing Sheets

(56) References Cited

U.S. PATENT DOCUMENTS

| | | | |
|---|---|---|---|
| 2001/0029419 A1* | 10/2001 | Matsumoto | B60W 40/068 701/80 |
| 2002/0007661 A1* | 1/2002 | Takahashi | B60T 8/172 73/9 |
| 2002/0072841 A1* | 6/2002 | Kogure | B60W 40/064 701/80 |
| 2010/0211256 A1* | 8/2010 | Takenaka | B60W 40/068 701/31.4 |
| 2011/0106458 A1* | 5/2011 | Shiozawa | B60W 40/101 702/41 |
| 2011/0118935 A1* | 5/2011 | Shiozawa | B60W 40/068 701/33.4 |
| 2012/0029783 A1* | 2/2012 | Takenaka | B60T 8/172 701/73 |
| 2013/0103279 A1* | 4/2013 | Asano | B60T 8/17636 701/72 |
| 2017/0072923 A1 | 3/2017 | Asano | |

* cited by examiner

APPARATUS FOR ESTIMATING FRICTION COEFFICIENT OF ROAD SURFACE AND METHOD THEREOF

CROSS-REFERENCE TO RELATED APPLICATIONS

This application claims priority to Korean Patent Application No. 10-2019-0159980, filed in the Korean Intellectual Property Office on Dec. 4, 2019, which application is hereby incorporated herein by reference.

TECHNICAL FIELD

The present disclosure relates to a technique for estimating a friction coefficient of a road surface and a method thereof.

BACKGROUND

As an engine performance of a vehicle increases, a driving speed of the vehicle also increases. Accordingly, various electronic control systems are mounted on the vehicle to improve driving stability and secure braking stability.

The electronic control system of the above-described vehicle includes an anti-lock brake system (ABS) that secures braking stability by repeating braking and braking release depending on slip of a wheel during braking of the vehicle, a tracking control system (TCS) preventing sudden acceleration of the vehicle and slippage of the driving wheel during rapid acceleration, and an electronic stability control (ESC) which controls brake pressure by combining the ABS and the TCS to improve driving stability of the vehicle.

In particular, the ESC determines whether a state of the driving vehicle is understeer or oversteer through a plurality of sensors such as a wheel speed sensor, a brake pressure sensor, a steering angle sensor, a yaw rate sensor, a lateral acceleration sensor, and the like and then individually controls a braking operation of an inner wheel and an outer wheel responding to the determined state, to stably maintain a vehicle posture.

It is very important to estimate a friction coefficient of a road surface with high accuracy because the electronic control system determines the state of the vehicle based on the friction coefficient of the road surface on which the vehicle is running and performs control responding thereto.

In a conventional technique for estimating a friction coefficient of a road surface, which is a technique for estimating the friction coefficient of the road surface based on longitudinal acceleration, lateral acceleration, yaw rate and steering angle of the vehicle, a longitudinal force acting on the front and rear wheels is estimated using the longitudinal acceleration and the lateral acceleration, a lateral longitudinal force acting on the front and rear wheels is estimated using the lateral acceleration, the yaw rate, and the steering angle, a longitudinal force acting on the front and rear wheels respectively using the longitudinal acceleration of the vehicle, and the friction coefficient of the road surface is estimated using the estimated longitudinal force and lateral force.

The above-described conventional friction coefficient of the road surface estimation technique is capable of estimating the friction coefficient of the road surface only in a sudden braking or turning situation, but there is a problem in that the friction coefficient of the road surface is not capable of being estimated in a gentle turning situation.

The above information disclosed in this section is only for enhancement of understanding of the background of the disclosure and therefore it may contain information that does not form the prior art that is already known to a person of ordinary skill in the art.

SUMMARY

The present disclosure relates to a technique for estimating a friction coefficient of a road surface in a vehicle and a method thereof. Particular embodiments relate to a technique for estimating a friction coefficient of a road surface in a vehicle to which a rear wheel steering (RWS) system is applied and a method thereof. The embodiments of the present disclosure have been made to solve problems occurring in the prior art while advantages achieved by the prior art are maintained intact.

An embodiment of the present disclosure provides an apparatus for estimating a friction coefficient of a road surface capable of estimating the friction coefficient even in a moderate turning situation as well as a sudden braking or turning situation of a vehicle equipped with a rear wheel steering (RWS) system, in which the friction coefficient of the road surface is estimated based on a control current value of a RWS motor and a movement amount (stroke value) of a rear wheel steering link responding to the control current value of the RWS motor, and a method thereof.

The technical problems to be solved by the present inventive concept are not limited to the aforementioned problems, and any other technical problems not mentioned herein will be clearly understood from the following description by those skilled in the art to which the present disclosure pertains.

According to an embodiment of the present disclosure, an apparatus may include a current sensor that measures a control current value of a rear wheel steering (RWS) motor, a stroke sensor that measures a stroke value indicating a movement amount of a rear wheel steering link, and a controller that estimates the friction coefficient of the road surface based on the control current value measured by the current sensor and the stroke value measured by the stroke sensor.

The apparatus may further include a storage device that stores a map in which the friction coefficient of the road surface responding to the control current value and the stroke value is recorded.

Here, the controller may estimate the friction coefficient of the road surface based on the map stored in the storage device.

The apparatus may further include a vehicle speed sensor that measures a speed of a vehicle, and a storage device that stores a map in which a friction coefficient of a road surface responding to the control current value and the stroke value is recorded in a first speed section of the vehicle and a map in which a friction coefficient of a road surface responding to the control current value and the stroke value is recorded in a second speed section of the vehicle.

Here, the controller may select the map among a plurality of maps stored in the storage device based on the vehicle speed measured by the vehicle speed sensor and estimate the friction coefficient of the road surface based on the selected map.

According to an embodiment of the present disclosure, a method may include measuring a control current value of a rear wheel steering (RWS) motor in a current sensor, measuring a stroke value indicating a movement amount of a rear wheel steering link in a stroke sensor, and estimating the friction coefficient of the road surface based on the control current value measured by the current sensor and the stroke value measured by the stroke sensor in a controller.

The method may further include storing a map in which the friction coefficient of the road surface responding to the control current value and the stroke value is recorded in a storage device.

Here, the estimating of the friction coefficient of the road surface may include estimating the friction coefficient of the road surface based on the map stored in the storage device.

The method may further include measuring a speed of the vehicle in a vehicle speed sensor, and storing a map in which a friction coefficient of a road surface responding to the control current value and the stroke value is recorded in a first speed section of the vehicle and a map in which a friction coefficient of a road surface responding to the control current value and the stroke value is recorded in a second speed section of the vehicle, in a storage device.

Here, the estimating of the friction coefficient of the road surface may include selecting the map among a plurality of maps stored in the storage device based on the vehicle speed measured by the vehicle speed sensor, and estimating the friction coefficient of the road surface based on the selected map.

According to an embodiment of the present disclosure, an apparatus may include a first current sensor that measures a control current value of a left rear wheel steering (RWS) motor, a first stroke sensor that measures a stroke value indicating a movement amount of a left rear wheel steering link, a second current sensor that measures a control current value of a right RWS motor, a second stroke sensor that measures a stroke value indicating a movement amount of a right rear wheel steering link, and a controller that estimates a friction coefficient of a first road surface based on the control current value measured by the first current sensor and the stroke value measured by the first stroke sensor, estimates a friction coefficient of a second road surface based on the control current value measured by the second current sensor and the stroke value measured by the second stroke sensor, and estimates a friction coefficient of a final road surface using the friction coefficient of the first road surface and the friction coefficient of the second road surface.

Here, the controller may estimate an average value of the friction coefficient of the first road surface and the friction coefficient of the second road surface as the friction coefficient of the final road surface.

In addition, the controller may determine the road surface on which the vehicle is traveling as a split road surface when a difference between the friction coefficient of the first road surface and the friction coefficient of the second road surface exceeds a threshold.

The apparatus may further include a storage device that stores a map in which the friction coefficient of the road surface responding to the control current value and the stroke value is recorded.

Here, the controller may estimate the friction coefficient of the first road surface and the friction coefficient of the second road surface based on the map stored in the storage device.

The apparatus may further include a vehicle speed sensor that measures a speed of a vehicle and a storage device that stores a map in which the friction coefficient of the road surface responding to the control current value and the stroke value is recorded in a first speed section of the vehicle and a map in which the friction coefficient of the road surface responding to the control current value and the stroke value is recorded in a second speed section of the vehicle.

Here, the controller may select a map of a plurality of maps stored in the storage device based on the vehicle speed measured by the vehicle speed sensor and estimate the friction coefficient of the first road surface and the friction coefficient of the second road surface based on the selected map.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
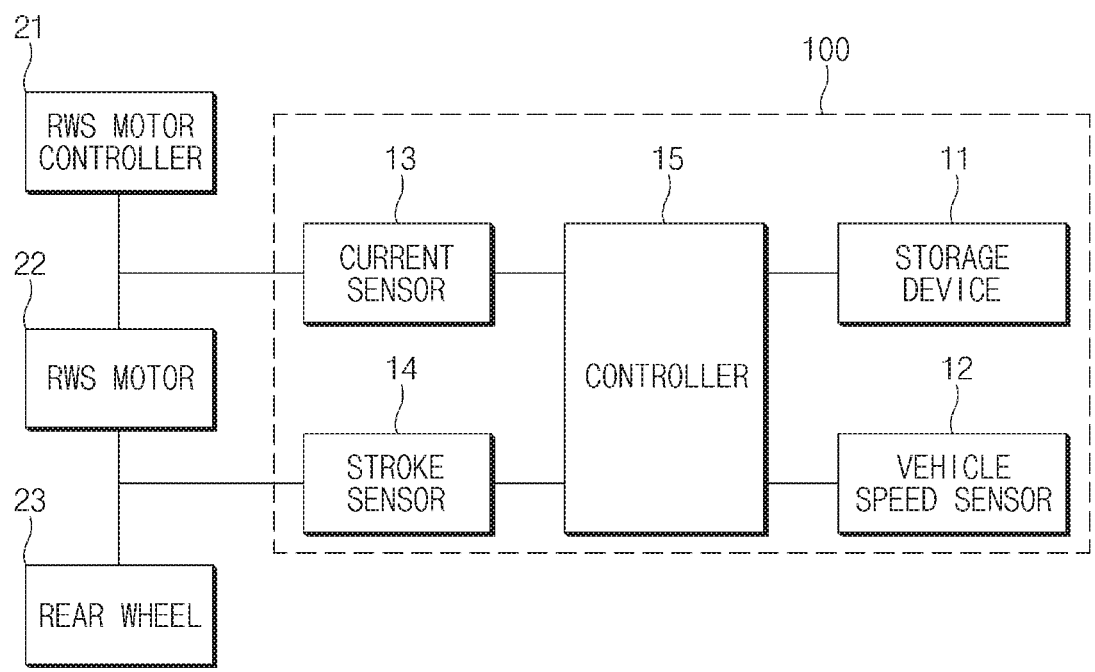
FIG. 1 is a block diagram of an apparatus for estimating a friction coefficient of a road surface according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the embodiments of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of aft, and are not to be interpreted as having ideal or excessively formal meanings unless clearly defined as having such in the present application.

FIG. 1 is a block diagram of an apparatus for estimating a friction coefficient of a road surface according to an embodiment of the present disclosure and illustrates a configuration which is capable of being applied to a vehicle equipped with a right and left integrated RWS system.

As illustrated in FIG. 1, an apparatus 100 for estimating a friction coefficient of a road surface according to an embodiment of the present disclosure may include a storage device 11, a vehicle speed sensor 12, a current sensor 13, a stroke sensor 14, and a controller 15. Here, each component may be combined with each other and implemented as one, or some components may be omitted based on a method of implementing the friction coefficient estimating apparatus 100 of the road surface according to an embodiment of the present disclosure.

The above-described components will be described, respectively. The storage device 11 may store various logics, algorithms and programs required in a process, where, in the vehicle equipped with the rear wheel steering (RWS) system, the friction coefficient of the road surface is estimated based on a control current value of a RWS motor and a movement amount (stroke value) of a rear wheel steering link responding to the control current value of the RWS motor.

For reference, the RWS system means a chassis control system which allows a rear wheel steering angle to operate in a reverse phase of a front wheel steering angle in a low-speed driving state of the vehicle to reduce a turning radius when turning and allows the rear wheel steering angle to operate in the same phase of the front wheel steering angle to improve stability when turning. The above-described RWS system steers rear wheels in the reverse phase to the steering of front wheels in a low-speed section and steers the rear wheels in the same phase as the steering of the front wheels in a high-speed section.

The storage device 11 may store a map in which the friction coefficient of the road surface responding to the control current value of the RWS motor and the movement amount (stroke value) of the rear wheel steering link is recorded.

The storage device 11 may store a first map in which the friction coefficient of the road surface responding to the control current value of the RWS motor and the movement amount (stroke value) of the rear wheel steering link in the low-speed section of the vehicle is recorded and a second map in which the friction coefficient of the road surface responding to the control current value of the RWS motor and the movement amount (stroke value) of the rear wheel steering link in the high-speed section of the vehicle is recorded. Here, it is possible to distinguish between low-speed and high-speed based on a value between 40 kph and 80 kph. For example, less than 60 kph may be set at low-speed and more than 60 kph may be set at high-speed.

Figure 2:
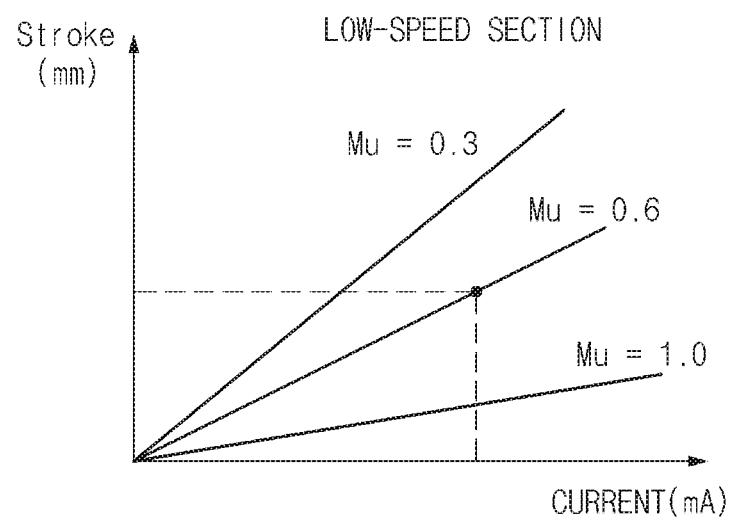
FIG. 2 is an example of a first map and a second map provided in an apparatus for estimating a friction coefficient of a road surface according to an embodiment of the present disclosure.
Figure 2:
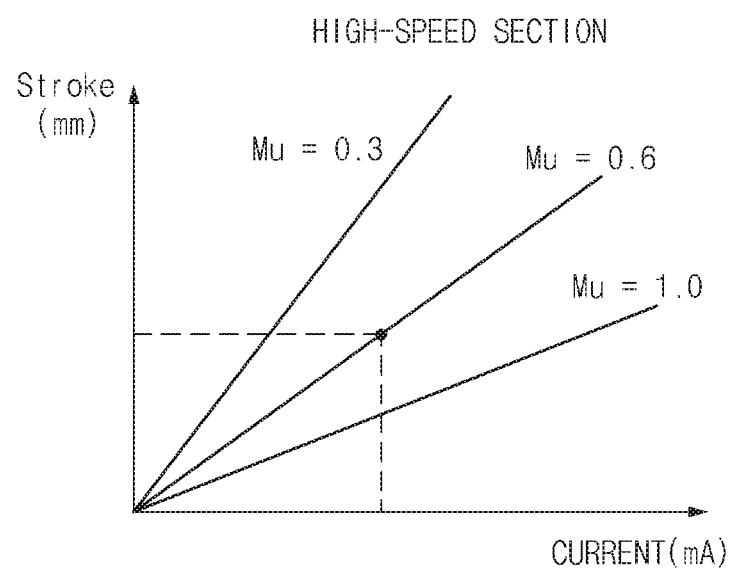

FIG. 2 is an example of a first map and a second map provided in an apparatus for estimating a friction coefficient of a road surface according to an embodiment of the present disclosure.

As illustrated in FIG. 2, in a low-speed section (a first speed section) and a high-speed section (a second speed section) of the vehicle, a horizontal axis represents a control current value (mA) of a RWS motor, and a vertical axis represents a stroke value (mm).

In the low-speed section of the vehicle, a graph having a friction coefficient of 0.3, a graph having a friction coefficient of 0.6, and a graph having a friction coefficient of to are illustrated and in the high-speed section of the vehicle, a graph having a friction coefficient of 0.3, a graph having a friction coefficient of 0.6, and a graph having a friction coefficient of to are illustrated. However, this is to help understanding and the number of graphs representing the friction coefficient may be arbitrarily changed according to a designer's intention.

Through FIG. 2, it may be seen that, in the case of a graph having the same coefficient of friction, a slope of the graph illustrated in the high-speed section is greater than that of the graph of the friction coefficient illustrated in the low-speed section.

The storage device 11 may include a at least one type of storage medium of a memory having a flash memory type, hard disk type, micro type, and card type (e.g., secure digital (SD) card or extreme digital (XD) card), and a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The vehicle speed sensor 12 measures the speed of the vehicle. Of course, the controller 15 may estimate the speed of the vehicle without the vehicle speed sensor 12.

The current sensor 13 may measure the control current value (mA) input from an RWS motor controller 21 to an RWS motor 22. Here, the RWS motor 22 steers a rear wheel 23 by moving the steering link of the rear wheel 23 based on the control current value.

The stroke sensor 14 may measure the movement amount (mm) of the steering link of the rear wheel 23.

The controller 15 performs overall control so that each of the components may perform its functions normally. The controller 15 may be implemented in a form of hardware, software, or a combination of hardware and software. Preferably, the controller 15 may be implemented as a microprocessor, but is not limited thereto.

In particular, the controller 15 may be applied to a vehicle equipped with a right and left integrated rear wheel steering (RWS) system to perform various controls in a process which estimates the friction coefficient of the road surface based on the control current value of the RWS motor 22 and the movement amount (stroke value) of the steering link of the rear wheel 23 responding to the control current value of the RWS motor 22.

The controller 15 may estimate the friction coefficient of the road surface based on the control current value of the RWS motor 22 measured by the current sensor 13 and the movement amount of the steering link of the rear wheel 23 measured by the stroke sensor 14.

The controller 15 may estimate the friction coefficient of the road surface responding to the control current value of the RWS motor 22 measured by the current sensor 13 and the movement amount of the steering link of the rear wheel 23 measured by the stroke sensor 14, based on the maps stored in the storage device 11.

The controller 15 may select one map among a plurality of maps stored in the storage device 11 based on the speed of the vehicle measured by the vehicle speed sensor 12 and estimate the friction coefficient of the road surface responding to the control current value of the RWS motor 22 measured by the current sensor 13 and the movement amount of the steering link of the rear wheel 23 measured by the stroke sensor 14.

The friction coefficient of the road surface estimated by an embodiment of the present disclosure may be used to limit a target yaw rate for a chassis integration control.

Figure 3:
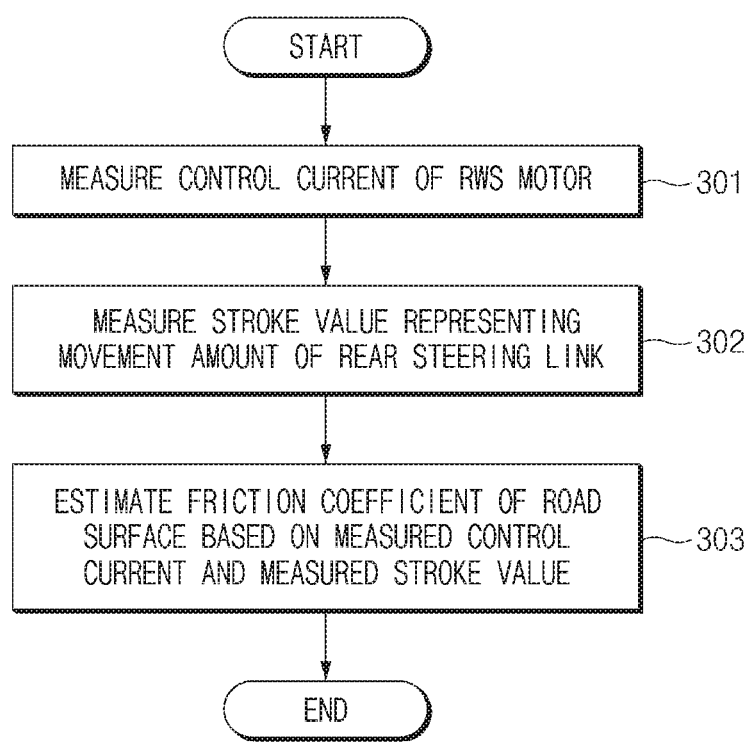
FIG. 3 is a flowchart for a method of estimating a friction coefficient of a road surface according to an embodiment of the present disclosure.

FIG. 3 is a flowchart for a method of estimating a friction coefficient of a road surface according to an embodiment of the present disclosure.

First, the current sensor 13 measures the control current value of the RWS motor 22 in 301.

Thereafter, the stroke sensor 14 measures the stroke value representing the movement amount of the rear wheel steering link in 302.

Then, the controller 15 estimates the friction coefficient of the road surface based on the current value measured by the current sensor 13 and the stroke value measured by the stroke sensor 14 in 303.

Figure 4:
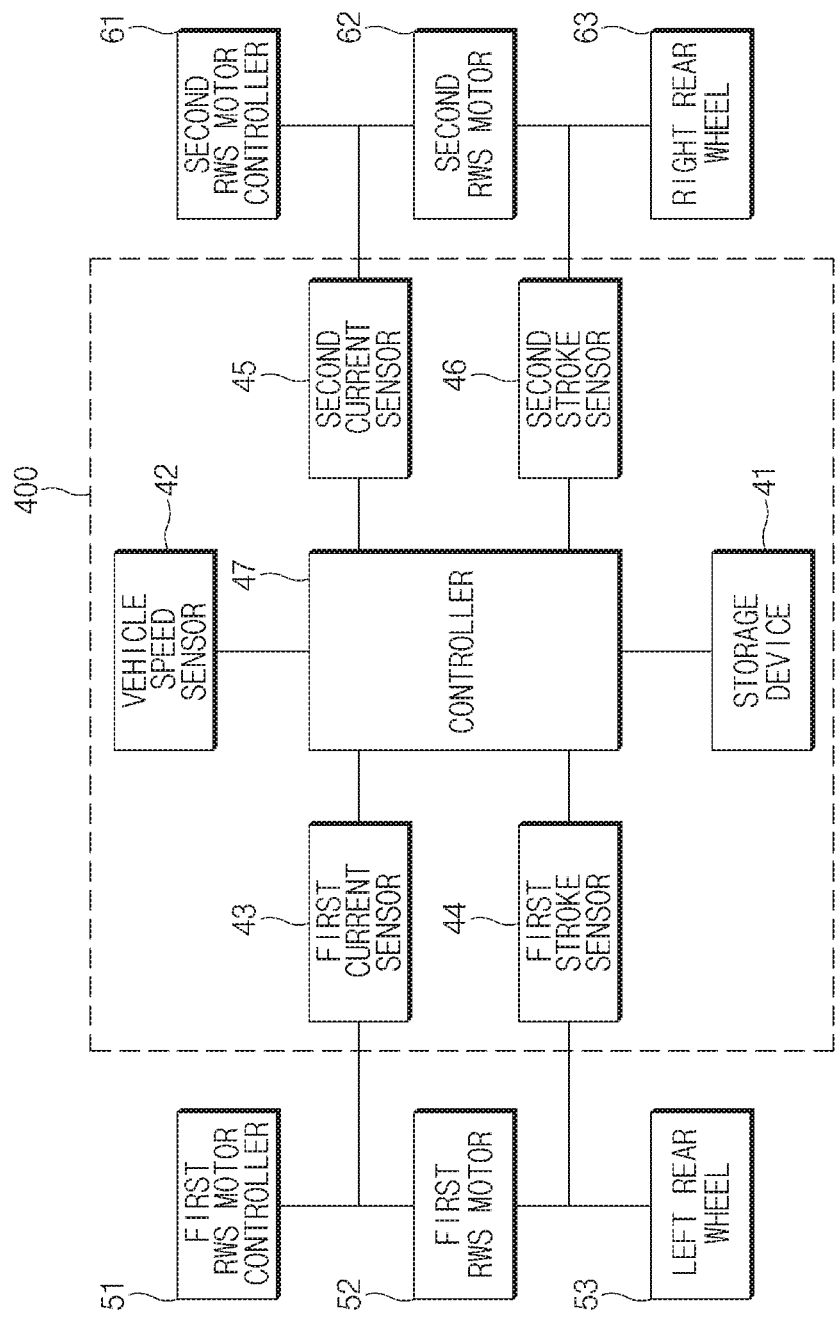
FIG. 4 is a block diagram of an apparatus for estimating a friction coefficient of a road surface according to another embodiment of the present disclosure.

FIG. 4 is a block diagram of an apparatus for estimating a friction coefficient of a road surface according to another embodiment of the present disclosure and illustrates a configuration which is capable of being applied to a vehicle equipped with a left and right independent RWS system.

As illustrated in FIG. 4, an apparatus 400 for estimating a friction coefficient of a road surface according to another embodiment of the present disclosure may include a storage device 41, a vehicle speed sensor 42, a first current sensor 43, a first stroke sensor 44, a second current sensor 45, a second stroke sensor 46, and a controller 47. Here, the storage device 41 stores the same data as the storage device 11 described above, and the vehicle speed sensor 42 also performs the same function as the vehicle speed sensor 12 described above, and will not be described any further.

The above-described components will be described, respectively. The first current sensor 43 may measure a control current value (mA) input from a first RWS motor controller 51 to a first RWS motor 52. Here, the first RWS motor 52 steers a left rear wheel 53 by moving the steering link of the left rear wheel 53 based on the control current value.

The first stroke sensor 44 may measure the stroke value representing a movement amount (mm) of the steering link of the left rear wheel 53.

The second current sensor 45 may measure a control current value (mA) input from a second RWS motor controller 61 to a second RWS motor 62. Here, the second RWS motor 62 steers a right rear wheel 63 by moving the steering link of the right rear wheel 63 based on the control current value.

The second stroke sensor 46 may measure a stroke value representing a movement amount (mm) of the steering link of the right rear wheel 63.

The controller 47 performs overall control so that each of the components may perform its functions normally. The controller 47 may be implemented in a form of hardware, software, or a combination of hardware and software. Preferably, the controller 47 may be implemented as a microprocessor, but is not limited thereto.

In the vehicle equipped with the left and right independent RWS system, the controller 47 may estimate a friction coefficient of a first road surface based on the control current value measured by the first current sensor 43 and the stroke value measured by the first stroke sensor 44, estimate a friction coefficient of a second road surface based on the control current value measured by the second current sensor 45 and the stroke value measured by the second stroke sensor 46, and a friction coefficient of a final road surface using the friction coefficient of the first road surface and the friction coefficient of the second road surface.

Based on the maps stored in the storage device 41, the controller 47 may estimate the friction coefficient of the first road surface based on the control current value measured by the first current sensor 43 and the stroke value measured by the first stroke sensor 44, estimate the friction coefficient of the second road surface based on the control current value measured by the second current sensor 45 and the stroke value measured by the second stroke sensor 46, and the friction coefficient of the final road surface using the friction coefficient of the first road surface and the friction coefficient of the second road surface.

The controller 47 may select one of a plurality of maps stored in the storage device 41 based on the speed of the vehicle measured by the vehicle speed sensor 42, and based on the selected map, may estimate the friction coefficient of the first road surface based on the control current value measured by the first current sensor 43 and the stroke value measured by the first stroke sensor 44, estimate the friction coefficient of the second road surface based on the control current value measured by the second current sensor 45 and the stroke value measured by the second stroke sensor 46, and the friction coefficient of the final road surface using the friction coefficient of the first road surface and the friction coefficient of the second road surface.

When a difference between the friction coefficient of the first road surface and the friction coefficient of the second road surface exceeds a threshold, the controller 47 may determine the road surface of the road on which the vehicle is traveling as a split road surface.

The controller 47 may estimate an average of the friction coefficient of the first road surface and the friction coefficient of the second road surface as the friction coefficient of the final road surface.

The friction coefficient of the road surface estimated by another embodiment of the present disclosure may be used to limit the target yaw rate for chassis integration control.

Figure 5:
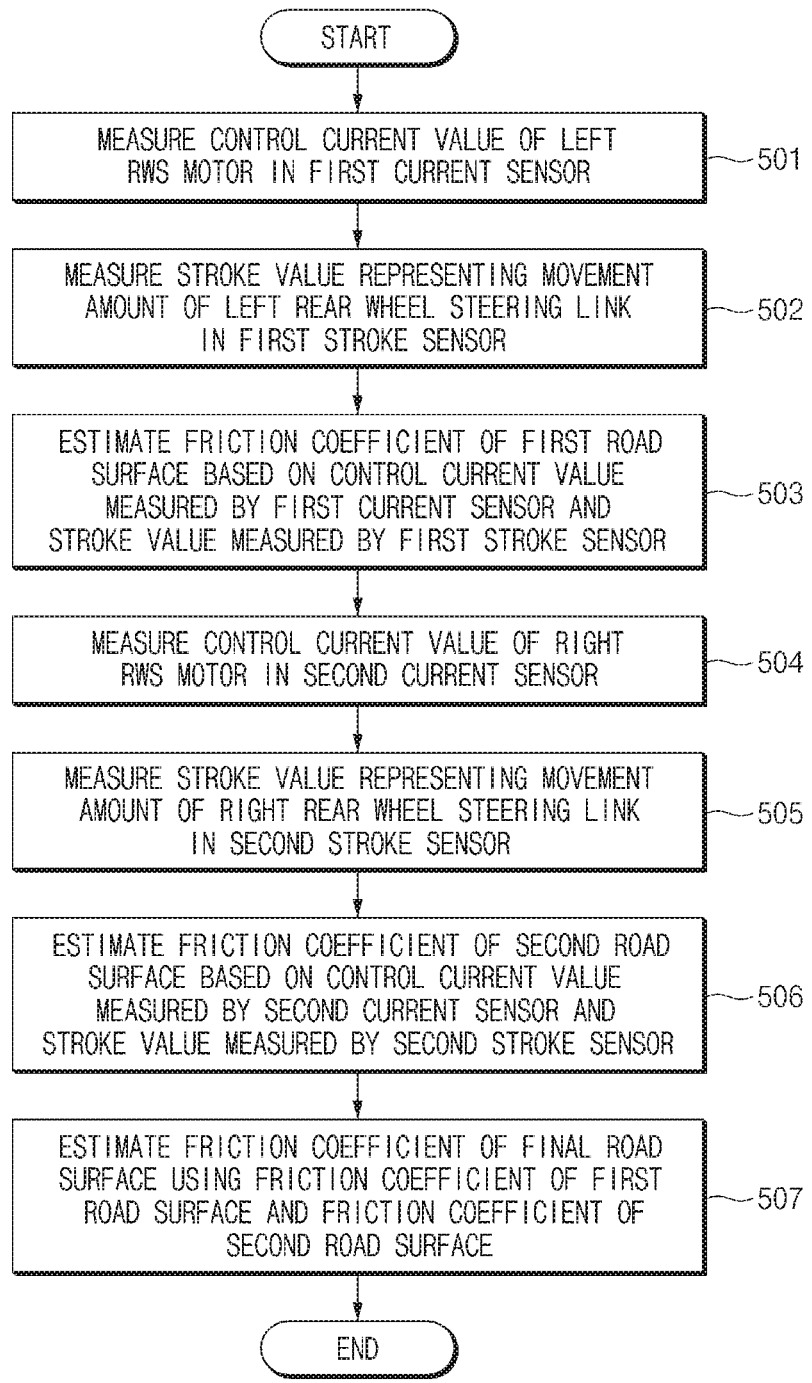
FIG. 5 is a flowchart for a method of estimating a friction coefficient of a road surface according to another embodiment of the present disclosure.

FIG. 5 is a flowchart for a method of estimating a friction coefficient of a road surface according to another embodiment of the present disclosure.

First, the first current sensor 43 measures the control current value of the left rear wheel steering (RWS) motor in 501. Here, the left RWS motor means the first RWS motor 52.

Thereafter, the first stroke sensor 44 measures a stroke value representing the movement amount of the left rear wheel steering link in 502.

Then, the controller 47 estimates the friction coefficient of the first road surface based on the control current value measured by the first current sensor 43 and the stroke value measured by the first stroke sensor 44 in 503.

Then, the second current sensor 45 measures the control current value of the right RWS motor in 504. Here, the right RWS motor means the second RWS motor 62.

Thereafter, the second stroke sensor 46 measures the stroke value representing the movement amount of the right rear wheel steering link in 505.

Then, the controller 47 estimates the friction coefficient of the second road surface based on the control current value measured by the second current sensor 45 and the stroke value measured by the second stroke sensor 46 in 506.

Thereafter, the controller 47 finally estimates the friction coefficient of the road surface using the friction coefficient of the first road surface and the friction coefficient of the second road surface in 507.

Figure 6:
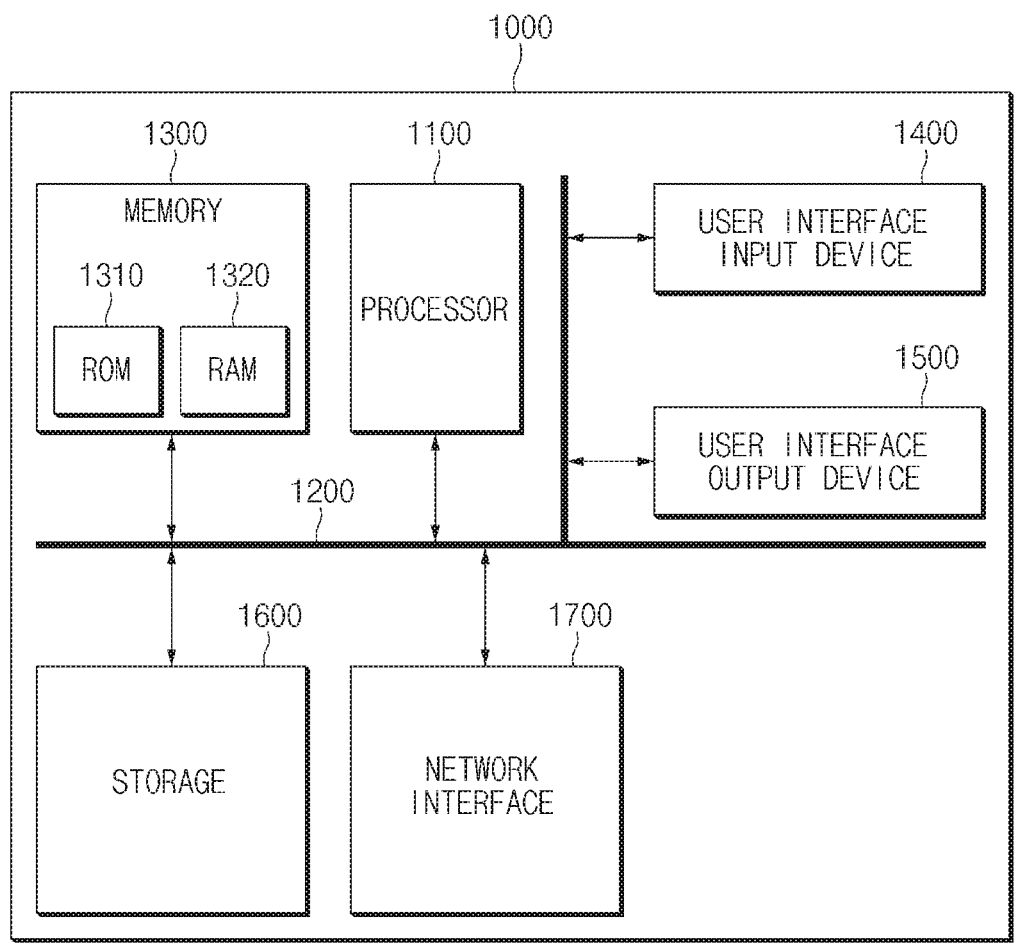
FIG. 6 is a block diagram illustrating a computing system for implementing a method of estimating a friction coefficient of a road surface according to an embodiment of the present disclosure.

FIG. 6 is a block diagram illustrating a computing system for implementing a method of estimating a friction coefficient of a road surface according to an embodiment of the present disclosure.

Referring to FIG. 6, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

In the apparatus for estimating the friction coefficient of the road surface according to an embodiment of the present disclosure and the method thereof, in the vehicle equipped with the rear wheel steering (RWS), the friction coefficient of the road surface may be estimated based on the control current value of the RWS motor and the movement amount (stroke value) of the rear wheel steering link responding to the control current value of the RWS motor to estimate the friction coefficient of the road surface in the moderated turning situation as well as the sudden braking or turning situation of the vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for estimating a friction coefficient of a road surface, the apparatus comprising:
   a current sensor configured to measure a control current value of a rear wheel steering (RWS) motor;
   a stroke sensor configured to measure a stroke value indicating a movement amount of a rear wheel steering link; and
   a controller configured to estimate the friction coefficient of the road surface based on the control current value measured by the current sensor and the stroke value measured by the stroke sensor,
   wherein the RWS motor is configured to steer the rear wheel based on the control current value.

2. The apparatus of claim 1, further comprising a storage device configured to store a map in which the friction coefficient of the road surface corresponding to the control current value and the stroke value is recorded.

3. The apparatus of claim 2, wherein the controller is configured to estimate the friction coefficient of the road surface based on the map stored in the storage device.

4. The apparatus of claim 1, further comprising:
   a vehicle speed sensor configured to measure a speed of a vehicle; and
   a storage device configured to store a first map in which a first friction coefficient of a road surface corresponding to the control current value and the stroke value is recorded in a first speed section of the vehicle and a second map in which a second friction coefficient of a road surface corresponding to the control current value and the stroke value is recorded in a second speed section of the vehicle.

5. The apparatus of claim 4, wherein the controller is configured to select a map among a plurality of maps stored in the storage device based on the speed of the vehicle measured by the vehicle speed sensor and to estimate the friction coefficient of the road surface based on the selected map.

6. A method of estimating a friction coefficient of a road surface, the method comprising:
   measuring a control current value of a rear wheel steering (RWS) motor, the RWS motor steering the rear wheel based on the control current value;
   measuring a stroke value indicating a movement amount of a rear wheel steering link; and
   estimating the friction coefficient of the road surface based on the measured control current value and the measured stroke value.

7. The method of claim 6, further comprising storing a map in which the friction coefficient of the road surface corresponding to the control current value and the stroke value is recorded in a storage device.

8. The method of claim 6, wherein estimating the friction coefficient of the road surface comprises estimating the friction coefficient of the road surface based on a map that associates the friction of coefficient of the road surface with corresponding control current values and stroke values.

9. The method of claim 8, further comprising a measuring vehicle speed, wherein the map includes different corresponding control current values and stroke values for different vehicle speeds, wherein estimating the friction coefficient of the road surface comprises estimating the friction coefficient of the road surface based on the map and the measured vehicle speed.

10. The method of claim 6, further comprising:
    measuring a speed of a vehicle; and
    storing a first map in which a first friction coefficient of a road surface corresponding to the control current value and the stroke value is recorded in a first speed section of the vehicle and a second map in which a second friction coefficient of a road surface corresponding to the control current value and the stroke value is recorded in a second speed section of the vehicle.

11. The method of claim 10, wherein estimating the friction coefficient of the road surface comprises:
    selecting a map among a plurality of maps stored in a storage device based on the measured speed of the vehicle; and
    estimating the friction coefficient of the road surface based on the selected map.

12. An apparatus for estimating a friction coefficient of a road surface, the apparatus comprising:

a first current sensor configured to measure a first control current value of a left rear wheel steering (RWS) motor;

a first stroke sensor configured to measure a first stroke value indicating a movement amount of a left rear wheel steering link;

a second current sensor configured to measure a second control current value of a right RWS motor;

a second stroke sensor configured to measure a second stroke value indicating a movement amount of a right rear wheel steering link; and a controller configured to estimate a friction coefficient of a first road surface based on the first control current value measured by the first current sensor and the first stroke value measured by the first stroke sensor, estimate a friction coefficient of a second road surface based on the second control current value measured by the second current sensor and the second stroke value measured by the second stroke sensor, and estimate a friction coefficient of a final road surface using the friction coefficient of the first road surface and the friction coefficient of the second road surface, wherein the left RWS motor is configured to steer the left rear wheel based on the first control current value, and wherein the right RWS motor is configured to steer the right rear wheel based on the second control current value.

13. The apparatus of claim 12, wherein the controller is configured to estimate an average value of the friction coefficient of the first road surface and the friction coefficient of the second road surface as the friction coefficient of the final road surface.

14. The apparatus of claim 12, further comprising a storage device configured to store a map in which the friction coefficient of the final road surface is recorded.

15. The apparatus of claim 14, wherein the controller is configured to estimate the friction coefficient of the first road surface and the friction coefficient of the second road surface based on the map stored in the storage device.

16. The apparatus of claim 12, further comprising:
a vehicle speed sensor configured to measure a speed of a vehicle; and
a storage device configured to store a first map in which the friction coefficient of the final road surface is recorded in a first speed section of the vehicle and a second map in which the friction coefficient of the final road surface is recorded in a second speed section of the vehicle.

17. The apparatus of claim 16, wherein the controller is configured to select a map of a plurality of maps stored in the storage device based on the speed of the vehicle measured by the vehicle speed sensor and estimate the friction coefficient of the first road surface and the friction coefficient of the second road surface based on the selected map.

18. The apparatus of claim 12, wherein the controller is configured to determine a road surface on which a vehicle is traveling as a split road surface when a difference between the friction coefficient of the first road surface and the friction coefficient of the second road surface exceeds a threshold.

19. The apparatus of claim 1, further comprising a storage device storing a first map in which a first friction coefficient of a road surface corresponding to the control current value and the stroke value is recorded in a first speed section of a vehicle and a second map in which a second friction coefficient of a road surface corresponding to the control current value and the stroke value is recorded in a second speed section of the vehicle.

20. The apparatus of claim 2, wherein the controller is configured to estimate the friction coefficient of the road surface based on the map stored in the storage device and a speed of a vehicle.

* * * * *